United States Patent [19]

Mandelcorn

[11] Patent Number: 5,821,643

[45] Date of Patent: Oct. 13, 1998

[54] SYNCHRONIZATION CONTROL SCHEME FOR A PLURALITY OF SWITCHING CIRCUITS, METHOD OF OPERATION THEREFOR AND BATTERY PLANT EMPLOYING THE SAME

[75] Inventor: Yehoshua Mandelcorn, Dallas, Tex.

[73] Assignee: Lucent Technologies Inc., Murray Hill, N.J.

[21] Appl. No.: 872,423

[22] Filed: Jun. 10, 1997

Related U.S. Application Data

[63] Continuation-in-part of Ser. No. 511,197, Aug. 4, 1995, Pat. No. 5,646,463.

[51] Int. Cl.[6] .................................................. H02M 1/37
[52] U.S. Cl. ............................ 307/127; 307/125; 307/138; 327/29; 327/82; 331/111; 331/129; 320/25; 363/63
[58] Field of Search .............................. 307/127, 125, 307/116, 112, 138; 320/25, 26; 303/63; 333/111, 129; 327/29, 182

[56] References Cited

U.S. PATENT DOCUMENTS

| | | | |
|---|---|---|---|
| 4,095,885 | 6/1978 | Freeman et al. | 307/127 |
| 4,144,483 | 3/1979 | Thornley | 320/25 |
| 4,338,656 | 7/1982 | Yamakido | 363/63 |
| 4,752,703 | 6/1988 | Lin | 327/391 |
| 5,182,466 | 1/1993 | Ohkibo | 307/127 |
| 5,481,211 | 1/1996 | Vietze et al. | 327/29 |

*Primary Examiner*—John W. Cabeca
*Assistant Examiner*—Albert W. Paladini

[57] ABSTRACT

A synchronization control scheme that provides a drive signal to a plurality of switching circuits and method of operation therefor. The synchronization controller, includes: (1) a plurality of dual threshold relaxation oscillators, coupled to a corresponding plurality of storage devices, that each assume a first state when a characteristic across a corresponding storage device is below a first threshold value and a second state when the characteristic across the corresponding storage device is above a second threshold value, (2) an oscillator OR-ing circuit, coupled to outputs of the plurality of dual threshold relaxation oscillators, that, when a controlling one of the plurality of dual threshold relaxation oscillators assumes the first state, allows the controlling one of the plurality of dual threshold relaxation oscillators to control the plurality of dual threshold relaxation oscillators, (3) a plurality of frequency dividers, coupled to corresponding ones of the plurality of dual threshold relaxation oscillators, that divide an OR-ed output of the plurality of dual threshold relaxation oscillators and (4) a divider OR-ing circuit, coupled to outputs of the plurality of frequency dividers, that maintains a phase synchronization between the plurality of frequency dividers and provides the drive signal to the plurality of switching circuits.

20 Claims, 2 Drawing Sheets

SYNCHRONIZATION CONTROL SCHEME FOR A PLURALITY OF SWITCHING CIRCUITS, METHOD OF OPERATION THEREFOR AND BATTERY PLANT EMPLOYING THE SAME

CROSS-REFERENCE TO RELATED APPLICATIONS

This application is a continuation-in-part of U.S. patent application Ser. No. 08/511,197, entitled "Synchronization Control for Interrelated DC Voltage/Battery Polarity Switching Circuits," to Mandelcorn, filed on Aug. 4, 1995, now U.S. Pat. No. 5,646,463. The above-listed application is commonly assigned with the present invention and is incorporated herein by reference as if reproduced herein in its entirety.

TECHNICAL FIELD OF THE INVENTION

The present invention is directed, in general, to power electronics and, more specifically to a synchronization control scheme for a plurality of switching circuits, method of operation therefor and battery plant employing the same.

BACKGROUND OF THE INVENTION

A battery plant generally includes a plurality of batteries and a plurality of switching circuits (e.g., polarity switching circuits) that generate a low frequency periodic waveform (e.g., a trapezoidal waveform) from a rectified input voltage. As a result of the relatively low frequency operation, isolation devices are not employed with the polarity switching circuits in the battery plant. An output of the polarity switching circuits is applied to a load through terminals of a co-axial cable or the like. Under these circumstances, a positive output of the batteries is coupled to an outer terminal of the co-axial cable and a negative output of the batteries is coupled to an inner terminal of the co-axial cable for one-half of an operating cycle. Conversely, the negative output of the batteries is coupled to the outer terminal of the coaxial cable and the positive output of the batteries is coupled to the inner terminal of the co-axial cable for the other one-half of the operating cycle.

Employing a plurality of switching circuits coupled to a common source provides several advantages. For instance, the arrangement as described provides a robust system allowing more equipment to be powered from the batteries. Additionally, in the event that a polarity switching circuit fails, the battery plant can remain in operation to provide power to most of the equipment coupled thereto.

It is important in circuits such as the polarity switching circuits that the plurality of circuits are synchronized with one another. If one polarity switching circuit is unsynchronized with the other polarity switching circuits, destructive currents within the battery plant may cause damage to a polarity switching circuit, the voltage source or any other components of the battery plant. Returning to the case where the battery plant is coupled to the load through a co-axial cable, the outer terminal of the co-axial cable is coupled to ground. Consequently, if the plurality of polarity switching circuits are not synchronized, one polarity switching circuit will attempt to couple the positive output of the batteries to the ground and, at the same time, another polarity switching circuit will attempt to couple the negative output of the batteries to the ground. As a result, the batteries will effectively be shorted out leading to destructive currents in the battery plant.

Establishing and maintaining synchronization between switching devices or inverters or other devices is generally accepted in the art. For instance, many control schemes employ a master/slave arrangement whereby one of many inverters assumes the rank of master and the remaining inverters (or slaves) are synchronized by the master. While such master/slave control schemes are commonly employed, a disadvantage of such control schemes is that the reliability of the system depends upon the reliability of the master inverter. In other words, if the master inverter is inoperable, the entire control scheme and system employing the control scheme may be inoperable.

Accordingly, what is needed in the art is a synchronization control scheme that synchronizes the operation between a plurality of switching circuits with inherent redundancy built-in, and produces a well regulated control signal to the switching circuits.

SUMMARY OF THE INVENTION

To address the above-discussed deficiencies of the prior art, the present invention provides a synchronization control scheme that provides a drive signal to a plurality of switching circuits, method of operation therefor and a battery polarity switching converter. The synchronization controller, includes: (1) a plurality of dual threshold relaxation oscillators, coupled to a corresponding plurality of storage devices, that each assume a first state when a characteristic across a corresponding storage device is below a first threshold value and a second state when the characteristic across the corresponding storage device is above a second threshold value, (2) an oscillator OR-ing circuit, coupled to outputs of the plurality of dual threshold relaxation oscillators, that, when a controlling one of the plurality of dual threshold relaxation oscillators assumes the first state, allows the controlling one of the plurality of dual threshold relaxation oscillators to control the plurality of dual threshold relaxation oscillators, (3) a plurality of frequency dividers, coupled to corresponding ones of the plurality of dual threshold relaxation oscillators, that divide an OR-ed output of the plurality of dual threshold relaxation oscillators and (4) a divider OR-ing circuit, coupled to outputs of the plurality of frequency dividers, that maintains a phase synchronization between the plurality of frequency dividers and provides the drive signal to the plurality of switching circuits.

The present invention therefore builds on the aforementioned related application, Ser. No. 08/511,197, and introduces the broad concept of dividing an output of the dual threshold relaxation oscillators to provide the drive signal to the plurality of switching circuits. In contrast to many master/slave control schemes, the synchronization control scheme of the present invention allows any one of the plurality of switching circuits to control the output thereof. Additionally, the synchronization control scheme provides a well regulated duty cycle for the plurality of switching circuits. For instance, the output waveform from the plurality of switching circuits may be regulated to attain about a 50% duty cycle with close tolerances.

The foregoing has outlined rather broadly features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DETAILED DESCRIPTION

Figure 1:
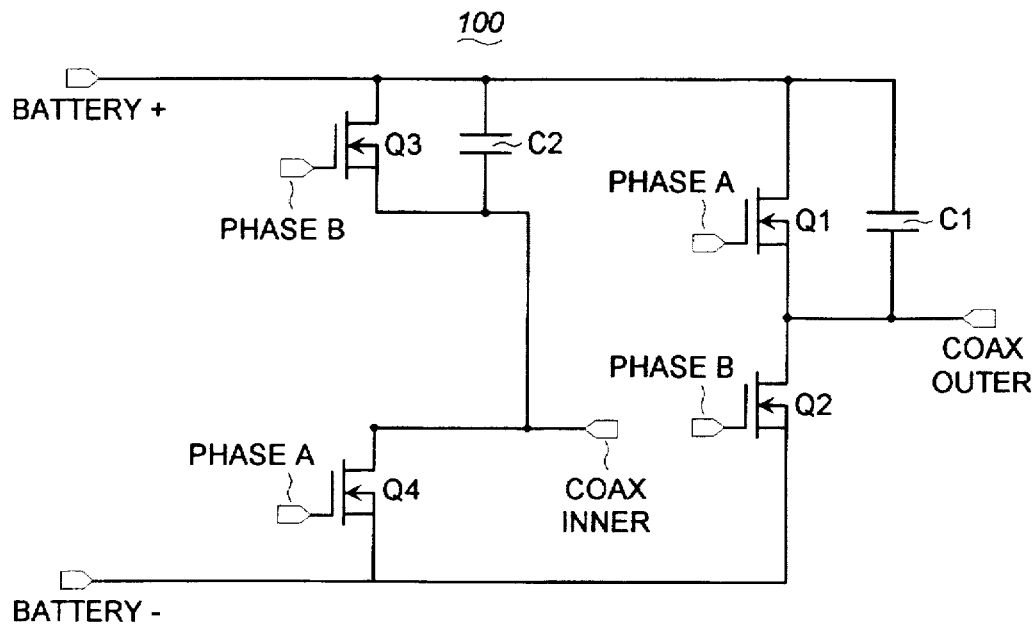
FIG. 1 illustrates a schematic diagram of an embodiment of a switching circuit constructed according to the principles of the present invention.

Referring initially to FIG. 1, illustrated is a schematic diagram of an embodiment of a switching circuit 100 constructed according to the principles of the present invention. While the present embodiment illustrates a polarity switching circuit 100, other switching circuits are well within the broad scope of the present invention.

The polarity switching circuit includes four metal-oxide semiconductor field-effect transistor ("MOSFET") switches Q1, Q2, Q3, Q4 connected in a bridge circuit. The switches Q1, Q2, Q3, Q4 alternately switch the polarity of the DC input voltage to a pair of output terminals COAX-INNER, COAX-OUTER connected to an inner and outer sheath of a co-axial cable, respectively. The co-axial cable is connected to a load that is energized by a low frequency AC voltage produced by the switches Q1, Q2, Q3, Q4. During half of the cycle time, a positive DC voltage is applied to the outer terminal COAX-OUTER and a negative DC voltage is applied to the inner terminal COAX-INNER. During the other half of the cycle time, a negative DC voltage is applied to the outer terminal COAX-OUTER and a positive DC voltage is applied to the inner terminal COAX-INNER. In a system having four loads to be energized (such as the embodiment of FIG. 2), up to four polarity switching circuits may be powered from a single DC voltage source.

In the illustrated embodiment, the outer terminals COAX-OUTERS are connected to ground. As a result, unless the polarity switches are synchronized, one phase of a polarity switch may connect a positive DC voltage to ground; also, another simultaneous phase of another polarity switch may connect a negative DC voltage to ground. This previously described circumstance effectively shorts out the DC voltage source and may lead to destructive currents within the polarity switching circuit.

While the switches Q1, Q2, Q3, Q4 are illustrated as MOSFET switches, other types of switching devices such as bipolar transistors are well within the broad scope of the present invention. Also, while the output is coupled to a coaxial cable having an output applied to the inner terminal COAX-INNER and the output return applied to the outer terminal COAX-OUTER, any type of connectivity to supply a load is within the broad scope of the present invention.

The four switches Q1, Q2, Q3, Q4 were connected in a bridge-type arrangement with opposite legs of the bridge circuit being turned on and off every alternate half cycle to deliver an alternating trapezoidal voltage waveform to the output coaxial cable. More specifically, the periodic cycle is split into two phases, an A and a B phase, each having an interval equal to about 50% of the time. During phase A, the first switch Q1 is turned on pulling the outer terminal COAX-OUTER to a positive DC voltage $V_{DC}+$ and the fourth switch Q4 is turned on pulling the inner terminal COAX-INNER to a negative DC voltage $V_{DC}-$. During phase B, the second switch Q2 is turned on pulling the outer terminal COAX-OUTER to a negative DC voltage $V_{DC}-$ and the third switch Q3 is turned on pulling the inner terminal COAX-INNER to a positive DC voltage $V_{DC}+$.

If two polarity switches are operating off the same DC voltage source, the output terminals COAX-OUTER are applied to the ground (and each other) and the switches are not synchronized, then the following situation may arise. The first switch of one polarity switching circuit may be conducting and connected to pull the positive DC voltage terminal to ground; simultaneously, the second switch of another polarity switching circuit may be conducting pulling a negative DC voltage terminal to ground. The condition may short out the DC voltage source and lead to large destructive circulating currents. The synchronization controller of the present invention synchronizes the polarity switching circuits to avoid the destructive currents as described above. Of course, the present invention is equally applicable to other circuits. For instance, one or more of the polarity switching circuits may be apart of a regulator circuit wherein the magnitude of the voltage applied to the output is regulated.

Figure 2:
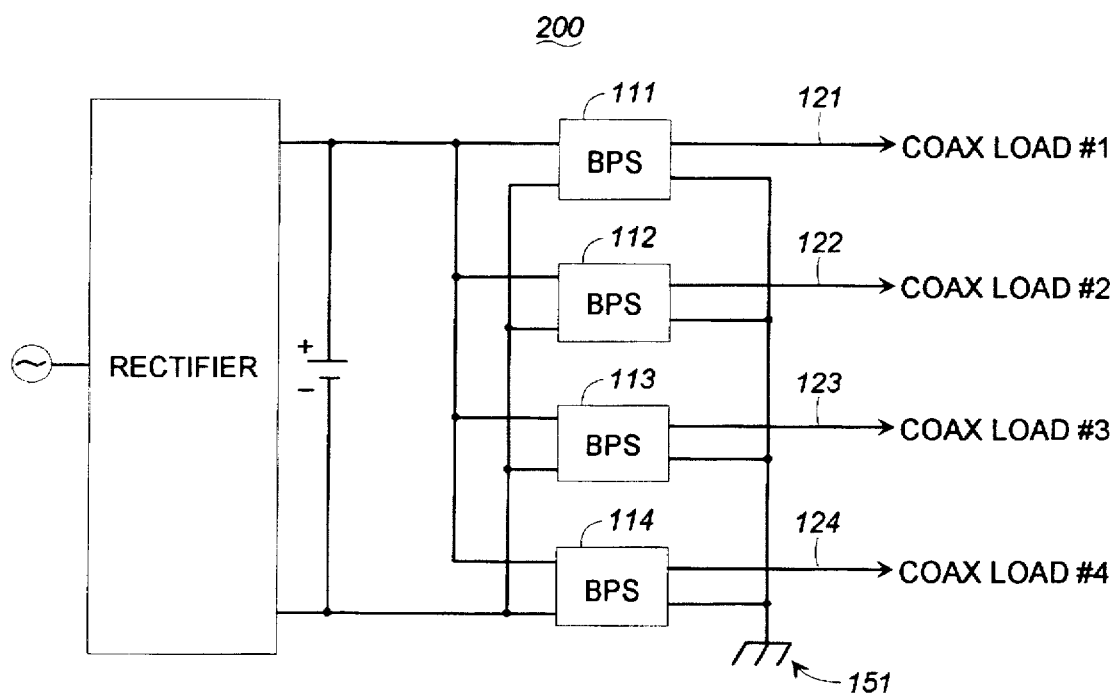
FIG. 2 illustrates an embodiment of a battery plant employing a plurality of interconnected polarity switching circuits constructed according to the principles of the present invention.

Turning now to FIG. 2, illustrated is a schematic diagram of a battery plant 200 employing a plurality of interconnected polarity switching circuits 111, 112, 113, 114 constructed according to the principles of the present invention. While the present embodiment illustrates a battery plant 200, other applications such as, without limitation, square wave ringers, are well within the broad scope of the present invention.

A rectified input voltage (via an input rectifier) is applied to the inputs of a plurality of polarity switching circuits 111, 112, 113, 114. Each of the polarity switching circuits 111, 112, 113, 114 is connected to an independent load through an output lead 121, 122, 123, 124, respectively, and a co-axial cable. Each load return is coupled to a ground connection 151. Each independent load is capable of being energized by a DC voltage or a low frequency AC voltage (e.g., 1 Hz to 60 Hz) waveform (e.g., trapezoidal waveform). The polarity switching circuits 111, 112, 113, 114 are not galvanically isolated from one another. Consequently, it is desirable to synchronize the operation of the polarity switching circuits 111, 112, 113, 114. Two interconnection paths (see FIG. 3) representing the synchronization signal interconnections between the polarity switching circuits 111, 112, 113, 114 are employed to provide synchronization therebetween and a controlled output duty cycle.

Figure 3:
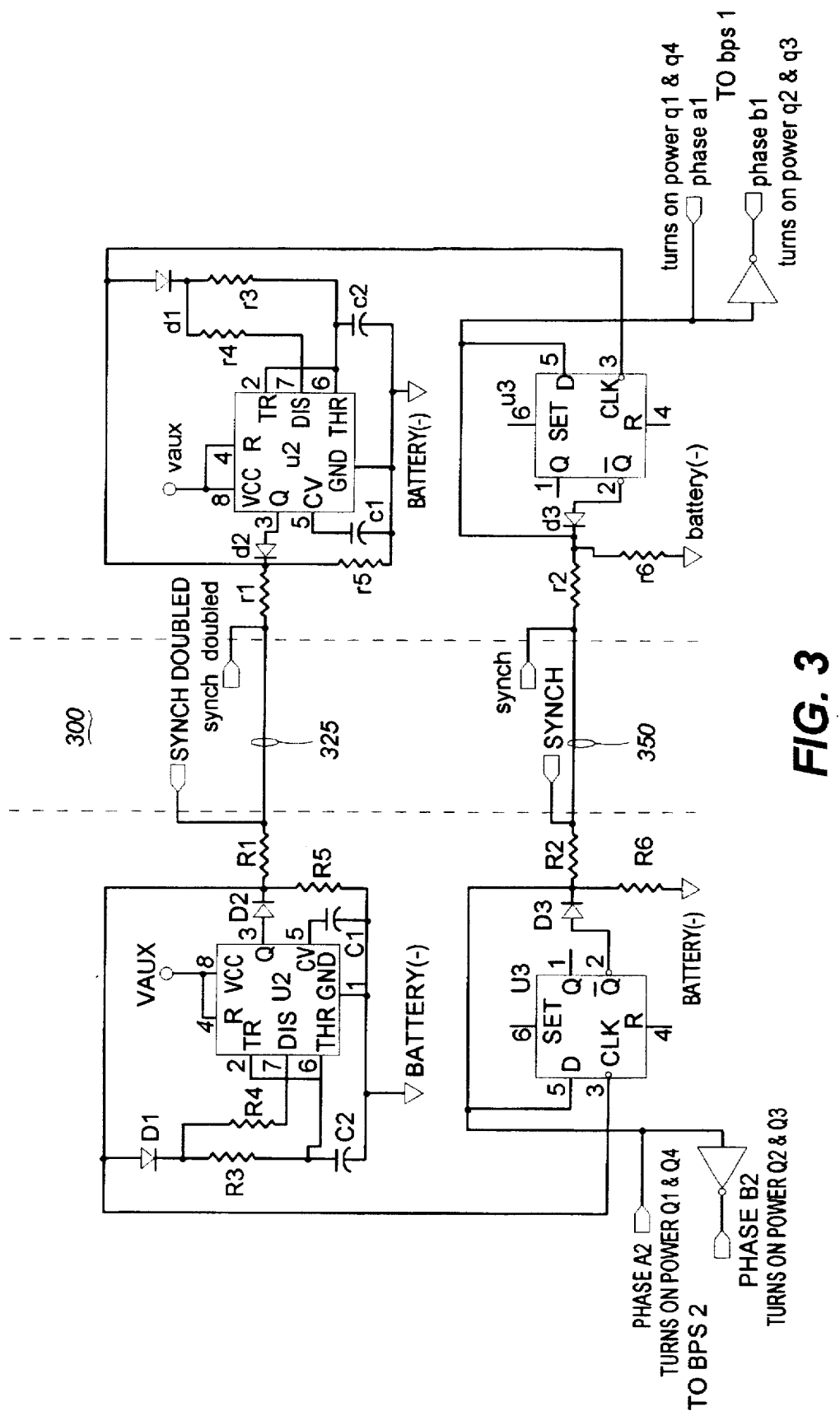
FIG. 3 illustrates a schematic diagram of an embodiment of a synchronization controller constructed according to the principles of the present invention.

Turning now to FIG. 3, illustrated is a schematic diagram of an embodiment of a synchronization controller 300 constructed according to the principles of the present invention. The synchronization controller 300 synchronizes the operation of two commonly-powered and grounded switching circuits bps1, BPS2. While only two switching circuits bps1, BPS2 are illustrated in the present embodiment, it should be understood that the synchronization controller 300 and the principles of the present invention may be extended to control multiple switching circuits.

The synchronization controller 300 includes a first and second dual threshold relaxation oscillator ("first and second oscillator"; e.g., a multistate '555 integrated timing circuit, part no. TLC555IDR, manufactured by Texas Instruments of Dallas, Tex. or "'555 circuit") u2, U2 coupled to a first and second frequency divider (e.g., a divide-by-two flip-flop, part no. CD4013BE, manufactured by Harris Semiconductor of Melbourne, Fla.) u3, U3, respectively. The first and second oscillator u2, U2 are coupled together via an oscillator OR-ing circuit including diodes d2, D2. The first and second frequency divider u3, U3 are coupled together via a divider OR-ing circuit including diodes d3, D3. The first oscillator u2 is coupled to, among other things, a first storage device (a capacitor) c2 and a diode d1 for controlling a charge across the capacitor c2. The second oscillator U2 is coupled to, among other things, a second storage device (a capacitor) C2 and a diode D1 for controlling a charge across the capacitor C2. While the first and second oscillators u2, U2 are '555 circuits in the present embodiment, other dual threshold relaxation oscillators or analogous devices are well within the broad scope of the present invention. Also, while the first and second frequency dividers u3, U3 are divide-by-two flip-flops in the present embodiment, other frequency dividers or analogous devices are well within the broad scope of the present invention. Also, while the first and second storage devices c2, C2 are capacitors in the present embodiment, other storage devices or analogous devices are well within the broad scope of the present invention.

In the illustrated embodiment, the first and second oscillators u2, U2 are set at about twice the frequency of the switching circuits bps1, BPS2. The first and second oscillators u2, U2 control the output frequency of the synchronization controller 300. The first and second frequency dividers u3, U3 provide a well regulated duty cycle output (e.g., having about a 50% duty cycle with improved tolerances) to the switching circuits bps1, BPS2. The first interconnection path 325 provides connectivity between the diodes d2, D2 and allows a controlling oscillator (in this case, the first or the second oscillator u2, U2) to control the first and second oscillator u2, U2. The second interconnection path 350 provides connectivity between the diodes d3, D3 and maintains a phase synchronization between the first and second frequency dividers u3, U3. The second interconnection path 350 also provides a path whereby a frequency divider (in this case, the first or second frequency divider u3, U3) clocked by the controlling oscillator may provide a drive signal to the first and second switching circuits bps1, BPS2.

Again, the first interconnection path 325 between the first and second oscillators u2, U2 operates at about twice the frequency of the switching circuits bps1, BPS2 and serves as the clock input CLK to the first and second frequency dividers u3, U3. At the rising edge of the clock input CLK, the first and second frequency dividers u3, U3 change state due to the fact the respective D inputs are coupled to the Q inverted outputs (of the first and second frequency dividers u3, U3, respectively) through the diodes d3, D3, respectively. The second interconnection path 350 coupled between the Q inverted outputs (of the first and second frequency dividers u3, U3) and the diodes d3, D3 ensures that the first and second frequency dividers u3, U3 are in phase following the first clock pulse.

Those skilled in the art should understand the operation of dual threshold relaxation oscillators such as the '555 circuit illustrated in the present embodiment. For a better understanding of timing circuits including dual threshold relaxation oscillators, see *The Art of Electronics*, by Paul Horowitz and Winfield Hill, Cambridge University Press (1989). The aforementioned reference is herein incorporated by reference. For purposes of convenience, however, the operation of the '555 circuit in the context of the present invention will hereinafter be described.

The '555 circuit here is used as the first and second oscillator u2, U2 to generate a 1–60 Hz, square waveform that ultimately controls the switching circuits bps1, BPS2. With reference to the first oscillator circuit u2, the trigger pin TR and threshold pin THR of the '555 circuit is coupled together and to the capacitor c2. The logic within the '555 circuit causes its output to go high when the voltage on the trigger pin TR drops below ⅓ of the auxiliary voltage VAUX; conversely, the output of the '555 circuit goes low when the voltage on the threshold pin THR rises above ⅔ of the auxiliary voltage VAUX. Also, when the output goes low, the discharge pin DIS goes low and discharges the capacitor c2 to below ⅓ of the auxiliary voltage to re-start the cycle.

The oscillation cycle may be defined in terms of the charge on the capacitor c2. When the voltage across the capacitor c2 drops below ⅓ of the auxiliary voltage VAUX, the Q output of the '555 circuit goes high and the discharge pin DIS becomes an open circuit. A current then flows from the Q output of the '555 circuit through the diodes d1, d2 and a resistor r3 to charge the voltage across the capacitor c2 to ⅔ of the auxiliary voltage VAUX. When the voltage across the capacitor c2, trigger pin TR and threshold pin THR reach ⅔ of the auxiliary voltage VAUX, the Q output and discharge pin DIS of the '555 circuit each pull low. The voltage across the capacitor c2 then discharges through a pair of resistors r3, r4 and the discharge pin DIS until the voltage across the capacitor c2 drops below ⅓ of the auxiliary VAUX. Thereafter, the discharge pin DIS goes open circuit and the Q output goes high thereby allowing the cycle to repeat. The values of the capacitor c2 and the resistors r3, r4 are selected to achieve the desired frequency for the respective switching circuit bps1. The same analysis obviously applies to the second oscillator U2.

Again, the diodes d2, D2 serve to provide the OR-ing function between the first and second oscillators u2, U2, such that if any one oscillator output is high, the first interconnection path 325 provides a common synchronization signal SYNCH-DOUBLED that is high. This allows a controlling oscillator (in this case, the first or the second oscillator u2, U2) to control the first and second oscillator u2, U2. The frequency dividers u3, U3 then divide the output (an OR-ed output) of the first and second oscillator u2, U2 based upon the signal of the controlling oscillator. The second interconnection path 350 provides another common synchronization signal SYNCH and the drive signal to the switching circuits bps1, BPS2. When the switching circuits bps1, BPS2 are polarity switching circuits under the conditions as described above and the common synchronization signal SYNCH goes high, the phase-A switches of the polarity switching circuits will be transitioned on. When the outputs of the first and second oscillator u2, U2 are low, the first interconnection path 325 provides a common synchronization signal SYNCH-DOUBLED that is low. A pair of resistors r5, R5 serve as a pull down resistor for the first and second oscillator u2, U2, respectively, to pull the first interconnection path 325 low. A pair of resistors r6, R6 serve as a pull down resistor for the first and second frequency divider u3, U3, respectively, to pull the second interconnection path 350 low. Under these circumstances, the phase-B switches of the polarity switching circuits will be transitioned on. The values of the resistors r1, R1, r2, R2 are typically selected to have low values such that the components do not affect the logic levels. The resistors r1, R1, r2, R2 serve to isolate high frequency electrical noise between the switching circuits bps1, BPS2.

The diodes d1, D1, among other things, allow the oscillator that goes high first to control the remaining oscillators and transition the other oscillators into a quiescent state. When a voltage across a capacitor c2, C2 drops below ⅓ of the auxiliary voltage VAUX, the respective oscillator goes high and ensures (via the synchronization signal SYNCH-DOUBLED over the first interconnection path 325) that the voltage across the other capacitors remain above ⅓ of the auxiliary voltage VAUX (via the diodes d1, D1 and resistors r3, R3). Hence, all the oscillators except one remain low throughout the entire cycle. Another oscillator will take over if the switching circuit with the fastest oscillator is removed from the circuit. The second fastest oscillator will then take over.

At the start-up of the circuit, the voltage across the storage devices c2, C2 is zero and the outputs of the first and second oscillators u2, U2 are high. The synchronization signal SYNCH-DOUBLED remains high until the voltage across the capacitors c2, C2 reach ⅔ of the auxiliary voltage VAUX. When the voltage across the capacitors c2, C2 reach ⅔ of the auxiliary voltage VAUX, then the synchronization signal SYNCH-DOUBLED goes low and the capacitors c2, C2 discharge through the respective resistors r3, r4 and R3, R4. The first capacitor having a voltage below ⅓ of the auxiliary voltage VAUX causes the output of the respective oscillator to go high, pulling the synchronization signal SYNCH-DOUBLED high thereby charging the other capacitors. Hence, only one oscillator goes high and takes control during each cycle. When the voltage across the respective capacitor reaches ⅔ of the auxiliary voltage VAUX, the oscillator output and synchronization signal SYNCH-DOUBLED go low again and the cycle is repeated.

If the switching circuit associated with the controlling oscillator is removed, the synchronization signal SYNCH-DOUBLED goes low and the voltage across the remaining capacitor will discharge. When the voltage across the first capacitor drops below ⅓ auxiliary voltage VAUX, the Q output of the respective oscillator will go high and take control over the other oscillators. Of course, the synchronization signal SYNCH follows the synchronization signal SYNCH-DOUBLED but at a divide frequency to provide a well regulated duty cycle to the switching circuits bps1, BPS2.

A few of the salient features of the synchronization controller include:

a) The combined synchronization signal SYNCH simultaneously controls the polarity of all the switching circuits;

b) The oscillators are connected such that the fastest oscillator takes control over the remaining oscillators. If the switching circuit with the fastest oscillator is removed, the switching circuit with the next fastest timing takes over;

c) The frequency dividers maintain a well regulated duty cycle (e.g., about a 50% duty cycle within improved tolerances) to the switching circuits; and d) The synchronization controller provides inherent redundancy.

For a better understanding of power electronics including power supplies and conversion technologies see "Principles of Power Electronics," by J. G. Kassakian, M. F. Schlecht and G. C. Verghese, Addison-Wesley (1991). For a better understanding of switching devices such polarity switching circuits or inverters and applications therefor, see *Power Electronics: Converters, Applications and Design*, 2nd Edition, by Ned Mohan, Tore M. Underland and William P. Robbins, John Wiley & Sons, Inc. (1995). The aforementioned references are herein incorporated by reference.

Although the present invention has been described in detail, those skilled in the art should understand that they can make various changes, substitutions and alterations herein without departing from the spirit and scope of the invention in its broadest form.

What is claimed is:

1. A synchronization controller for providing a drive signal to a plurality of switching circuits, comprising:

a plurality of dual threshold relaxation oscillators, coupled to a corresponding plurality of storage devices, that each assume a first state when a characteristic across a corresponding storage device is below a first threshold value and a second state when said characteristic across said corresponding storage device is above a second threshold value;

an oscillator OR-ing circuit, coupled to outputs of said plurality of dual threshold relaxation oscillators, that, when a controlling one of said plurality of dual threshold relaxation oscillators assumes said first state, allows said controlling one of said plurality of dual threshold relaxation oscillators to control said plurality of dual threshold relaxation oscillators;

a plurality of frequency dividers, coupled to corresponding ones of said plurality of dual threshold relaxation oscillators, that divide an OR-ed output of said plurality of dual threshold relaxation oscillators; and a divider OR-ing circuit, coupled to outputs of said plurality of frequency dividers, that maintains a phase synchronization between said plurality of frequency dividers and provides said drive signal to said plurality of switching circuits.

2. The synchronization controller as recited in claim 1 wherein said storage devices are voltage storage devices and said characteristic is a voltage.

3. The synchronization controller as recited in claim 1 wherein said frequency dividers are divide-by-two frequency dividers.

4. The synchronization controller as recited in claim 1 wherein said switching circuits are polarity switching circuits having a first and second switch.

5. The synchronization controller as recited in claim 1 wherein said dual threshold relaxation oscillators comprise a timing circuit.

6. The synchronization controller as recited in claim 1 further comprising a diode coupled to said storage devices to control a charge across said storage devices.

7. The synchronization controller as recited in claim 1 wherein said oscillator OR-ing circuit and said divider OR-ing circuit each comprise a diode.

8. A method of operating a synchronization controller to provide a drive signal to a plurality of switching circuits, comprising the steps of:

causing a plurality of dual threshold relaxation oscillators, coupled to corresponding pluralities of storage devices, to assume a first state when a characteristic across a corresponding storage device is below a first threshold value and a second state when said characteristic across said corresponding storage device is above a second threshold value;

when a controlling one of said plurality of dual threshold relaxation oscillators assumes said first state, allowing said controlling one of said plurality of dual threshold relaxation oscillators to control said plurality of dual threshold relaxation oscillators;

dividing an OR-ed output of said pluralities of dual threshold relaxation oscillators with a plurality of frequency dividers;

maintaining a phase synchronization between said plurality of frequency dividers; and allowing one of said plurality of frequency dividers to provide said drive signal to said plurality of switching circuits.

9. The method as recited in claim 8 wherein said storage devices are voltage storage devices and said characteristic is a voltage.

10. The method as recited in claim 8 wherein said frequency dividers are divide-by-two frequency dividers.

11. The method as recited in claim 8 wherein said switching circuits are polarity switching circuits having a first and second switch.

12. The method as recited in claim 8 wherein said dual threshold relaxation oscillators comprise a timing circuit.

13. The method as recited in claim 8 wherein the step of causing comprises the step of controlling a charge across said storage devices with a diode.

14. The method as recited in claim 8 wherein said dual threshold relaxation oscillators are coupled together by oscillator OR-ing circuits and said frequency dividers are coupled together by divider OR-ing circuits.

15. A battery plant, comprising:

an input source of electrical power;

an input rectifier coupled to said input source of electrical power;

a plurality of polarity switching circuits having a first and second switch, said plurality of switching circuits switching said input source of electrical power for delivery to a load; and a synchronization controller for providing a drive signal to a plurality of polarity switching circuits, comprising:

a plurality of dual threshold relaxation oscillators, coupled to corresponding pluralities of storage devices, that each assume a first state when a characteristic across a corresponding storage device is below a first threshold value and a second state when said characteristic across said corresponding storage device is above a second threshold value;

an oscillator OR-ing circuit, coupled to outputs of said plurality of dual threshold relaxation oscillators, that, when a controlling one of said plurality of dual threshold relaxation oscillators assumes said first state allows said controlling one of said plurality of dual threshold relaxation oscillators to control said plurality of dual threshold relaxation oscillators;

a plurality of frequency dividers, coupled to corresponding pluralities of dual threshold relaxation oscillators, that divide an OR-ed output of said plurality of dual threshold relaxation oscillators; and a divider OR-ing circuit, coupled to outputs of said plurality of frequency dividers, that maintains a phase synchronization between said plurality of frequency dividers and provides said drive signal to said plurality of polarity switching circuits.

16. The battery polarity switching converter as recited in claim 15 wherein said storage devices are voltage storage devices and said characteristic is a voltage.

17. The battery polarity switching converter as recited in claim 15 wherein said frequency dividers are divide-by-two frequency dividers.

18. The battery polarity switching converter as recited in claim 15 wherein said dual threshold relaxation oscillators comprise a timing circuit.

19. The battery polarity switching converter as recited in claim 15 further comprising a diode coupled to said storage devices to control a charge across said storage devices.

20. The battery polarity switching converter as recited in claim 15 wherein said oscillator OR-ing circuit and said divider OR-ing circuit each comprise a diode.

* * * * *